March 10, 1942.          S. C. STAMPS          2,275,696
FLASH LIGHT TESTER
Filed Aug. 1, 1940
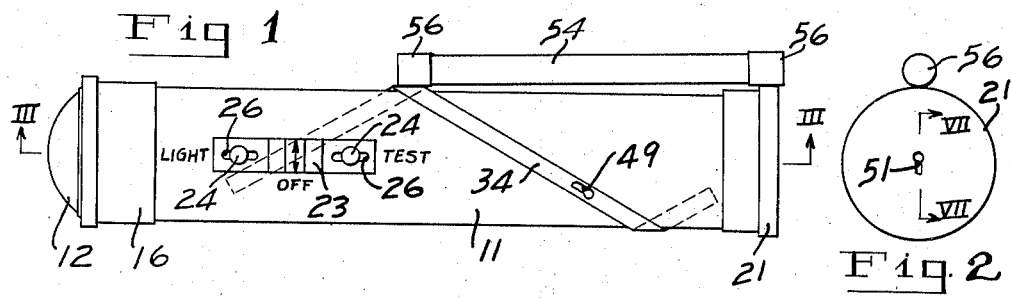
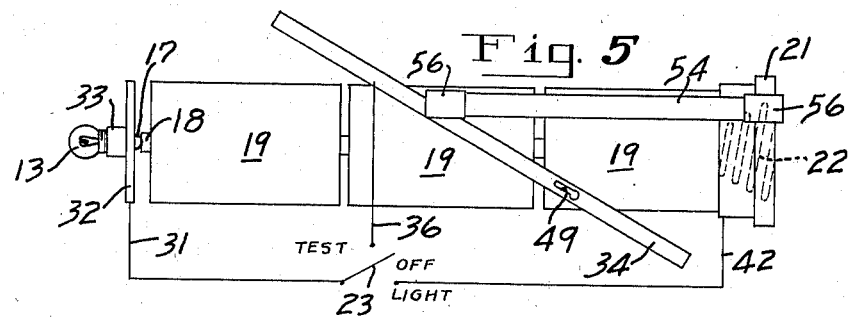
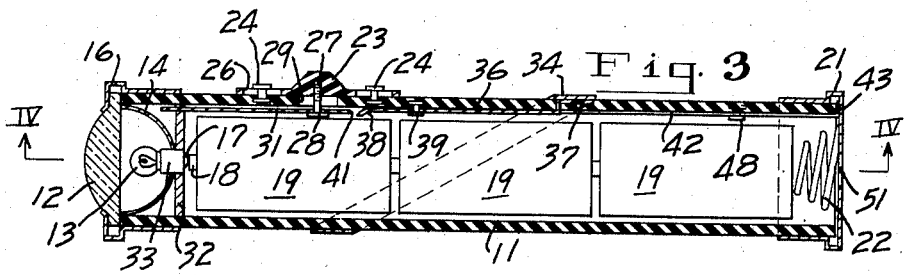
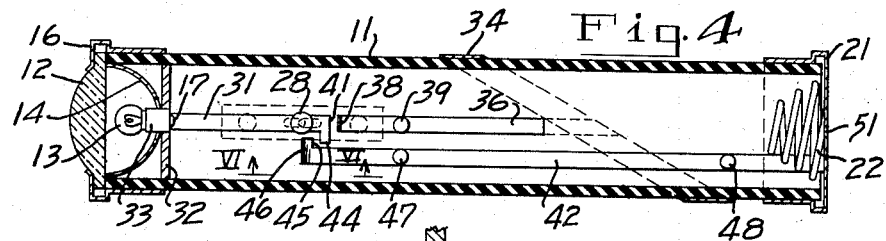
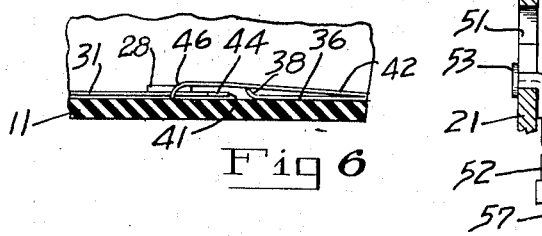
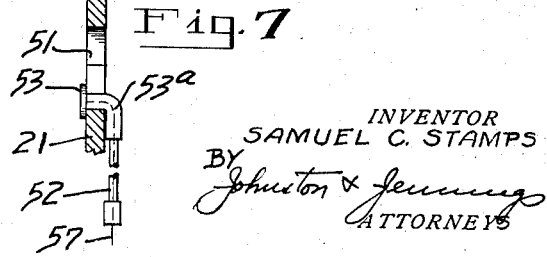
INVENTOR
SAMUEL C. STAMPS
BY
Johnston & Jennings
ATTORNEYS Patented Mar. 10, 1942

2,275,696

UNITED STATES PATENT OFFICE 2,275,696

FLASHLIGHT TESTER

Samuel C. Stamps, Birmingham, Ala.

Application August 1, 1940, Serial No. 349,363

3 Claims. (Cl. 175—183)

My invention relates to an improved flash light and tester combined, and is more particularly concerned with certain improvements in flash light testers of the kind used by electricians for testing fuses and circuits.

One object of my invention is to provide a flash light tester which shall be capable of testing fuses of varying lengths by merely holding the fuse in electrical contact with certain parts of the device.

Another object is to provide a flash light tester which shall be capable of testing a cartridge fuse, the body portion of which has swelled to a diameter larger than its metallic end terminals, as often happens when this type of fuse is installed in damped places.

A further object of my invention is the provision of a device of the character described which has its testing connections and other electrical parts so arranged that when the device is put in a tool box or in contact with other metallic objects, said connections do not cause a short circuit which would discharge the batteries.

A still further object of my invention is the provision of a flash light tester which is provided with means to readily attach and detach testing leads to electrically energized parts of the device so that circuits of various types may be tested.

Briefly, my invention comprises a flash light of the type embodying a case preferably formed of non-conducting material in which batteries are placed. The usual incandescent electric bulb is mounted on the front end of the case with one of its contacts connected to one pole of the battery. A metallic cap is secured to the rear end of the case and is provided with means to contact the other pole of the batteries. The case of the flash light has slidably mounted thereon a three-way electric switch which in one position energizes the light, in a second position is off, and in a third position partially closes a circuit which includes the bulb, the metallic cap, and a thin strip of electrical conducting material wound around the outside of the case. A fuse to be tested is placed with one terminal resting on the strip and with its other end on the rear cap. The switch is snapped to "test" position and if the fuse is good the circuit is completed therethrough whereupon the bulb lights up. On the other hand, if the use is bad the circuit is not completed and the bulb therefore does not light. Bayonet slots are provided in the end cap and in the strip and form means for readily attaching and detaching testing leads having on one end a circular flat headed member adapted to fit within the slot. One of these conductors is inserted in each of the bayonet slots, the switch is snapped to test position and if the two conductors are placed in a circuit the bulb lights up as already explained.

Referring to the accompanying drawing which forms a part of this application and which illustrates my invention in its preferred form only:

Fig. 1 is a plan view of my improved testing device showing a fuse in testing position thereon;

Fig. 2 is an end view of Fig. 1;

Fig. 3 is a sectional view taken on line III—III of Fig. 1;

Fig. 4 is a sectional view taken on line IV—IV of Fig. 3 but omitting any showing of the batteries;

Fig. 5 is a diagrammatic view illustrating the electrical circuits;

Fig. 6 is a detail fragmental sectional view taken on line VI—VI of Fig. 4, and illustrating a part of one form of electric switch employed with my device; and Fig. 7 is an enlarged sectional view taken on line VII—VII of Fig. 2 and showing a testing lead within one of the bayonet slots.

Referring to the drawing for a better understanding of my invention, I show a flash light having the usual barrel case 11 formed preferably of material which will not conduct electricity and having at the front end the glass 12, electric light bulb 13 and reflector 14. A retainer 16 secured to the end of the barrel serves to hold the parts assembled and to hold the electrical contact 17 of the bulb 13 in position to contact one pole 18 of the usual flash light battery 19.

At the opposite end of the case is secured a cap 21 formed of a material which will conduct electricity. A spring 22 contacts the cathode of the batteries 19 and also serves to bias a series of batteries with the pole 18 at the front battery always against the bulb contact 17.

Slidably mounted on the case 11 is a switch comprising a button 23 formed of non-conducting material and held to the case by means of small rivets 24 projecting through elongated slots 26 in the switch button 23. A stud 27 having a flat head 28 is screwed into the button 23 and projects through a slot 29 in the case 11 so that the button 23 is free to be moved forwardly or rearwardly from the position illustrated in the drawing which is the off position of the switch.

A thin strip of electrical conducting material 31 adapted to slide with the switch button 23 is secured thereto by means of the stud 27 and projects forwardly through an opening in a mounting bracket 32 for the bulb 13. The bracket 32 is formed of conductive material and has secured thereto a socket 33 for the bulb 13 so that an electric circuit is formed from one contact of the bulb 13 through the conductor 31.

Wrapped around the case 11 and secured thereto by any suitable means is a thin elongated strip of conducting material 34 such as copper, which, as will be seen in Figs. 1, 3 and 4, lies above the level of the outside surface of the case 11, thus to form a slightly raised contact member for receiving one terminal of a circuit to be tested. As seen in the drawing this strip of material extends spirally about the body from a point adjacent the cap 21 to a point adjacent the retainer 16 so that in effect the case 11 is provided with a conductor which at different points longitudinally of the body lies at varying distances from the end cap 21. While it is obvious that the strip 34 may be secured to the case in a straight line, that is, without winding it about the case, I have a special reason for winding it thereon. It is well known in this art that cartridge fuses, the main body portions of which are made of paper or fiber, often swell to such an extent that the body portions are larger in diameter than the end terminals. One terminal of a swollen fuse may readily be touched against the cap 21, and because the strip 34 is relatively narrow and spirally wound on the case, no difficulty is encountered in placing the other terminal against it, thus completing the testing circuit. Since the strip 34 lies slightly above the surface of case 11, the terminal of a swollen fuse may be more readily pressed into contact therewith.

A thin strip 36 formed of conducting material is electrically connected to the spirally wound strip 34 as at 37 and projects forwardly to a point adjacent the rearmost end of the slidable strip 31 where it is turned inwardly of case as shown at 38. A small rivet 39 serves to bias the inturned end 38 against the wall of the case 11 so that when the switch button 23 is snapped rearwardly, that is toward the cap 21, the rearward end 41 of the slidable strip 31 will engage the inturned end 38 of strip 36, thus connecting one contact of the bulb 13 with the spirally wound strip 34.

A third strip of conducting material 42 is electrically connected to the cap 21 as at 43, and the strip 42 extends forwardly past the end 41 of the slidable strip 31. The end 41 of the strip 31 is provided with an offset 44 (Fig. 4), while the forward end of the strip 42 is also provided with an offset 45 which is curved outwardly towards the case 11, as shown more particularly at 46 in Fig. 6. It will thus be apparent that when the switch button 23 is snapped forwardly to "light" position an electric circuit will be established from the bulb 13 through the batteries 19 because of the fact that when the button 23 is pushed forwardly the projection 44 contacts the out-turned end 46 of the conductor 42. Small rivets 47 and 48 serve to hold the strip 42 in position against the inside of the case 11.

Referring now more particularly to Figs. 1, 2 and 7, I show a means by which my tester may be used for testing circuits which, unlike a fuse, cannot be directly connected to the strip 34 and the cap 21. As seen in the drawing, I provide the strip 34 with a bayonet slot 49 and the cap 21 with a similar bayonet slot 51, which slots form snap-on connections for a pair of test leads 52. The testing leads 52 are provided on one end with a flat head 53 which is adapted to be snapped in engagement within the bayonet slots 49 and 51, it being understood that one of the testing leads 52 is provided for each of the slots 49 and 51. The head 53 is preferably formed on the end of a ferrule 53a which is bent to form a right angled member. The purpose of thus bending the ferrule is to prevent undue strains being put on the thin metal parts 34 and 21 when the user of the device is testing a circuit by grasping the two leads 52 and allowing the body part to dangle. The angled ferrule causes the strains due to the weight of the body part of the device to be imposed parallel with the surface of the cap 21 and strip 34, when the tester is supported from the leads 52, instead of being imposed thereon at right angles as would be the case if the ferrule 53a was straight.

The operation of my improved tester will be readily understood. If it is desired to test an electrical device, such as the fuse 54, all that is necessary for the user of the device to do is to snap the switch 23 rearwardly to the position marked "test" (Fig. 1) and place the fuse 54 with its terminals 56 on the cap 21 and the strip 34. In the bulb 13 lights the user knows that the fuse is good, but if on the other hand it fails to light he knows that the fuse is faulty. It will be noted that due to the strip of material 34 being wound spirally about the casing, fuses of varying lengths may be readily tested as well as those which are swollen, as already explained.

When testing a circuit by means of the testing leads 52, all that is necessary is that the operator insert one of the leads into each of the bayonet slots 49 and 51 and snap the switch 23 to test position. He may then apply the exposed ends 57 of the leads 52 to any desired electrical circuit and if the bulb 13 lights he knows that the circuit is conductive.

From the foregoing it will be apparent that I have devised a flash light tester which is simple of construction and very durable and efficient. It will be especially noted that my improved tester is free of any external projections other than those found in an ordinary flash light. This feature is extremely important as the users of this type of device carry the same in the pockets of their clothing and any sharp external projections such as posts for electrical testing connections are very undesirable. It will likewise be noted that my improved tester will not short circuit when put in a metallic tool box unless the user has left the switch in test position, and even then it will not be likely to short circuit because the strip 34 is relatively narrow. Although I have described the case 11 as being made of nonconducting material, it is obvious that with suitable insulation provided for the strip 34, bracket 32, and slidable strip 31, the case 11 could be made of metal or other conducting material.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination with a flash light having a battery case, a battery therein, an electric light bulb at one end of the case, a cap on the other end of the case adapted to receive one terminal of a fuse to be tested, said cap being formed of material to conduct electricity, and means connecting one pole of the battery to said cap, of a strip of electrical conductive material wrapped around the case in position to receive the other terminal of the fuse to be tested, a manually operable electric switch, means responsive to the switch being in one position to energize the bulb, and means responsive to the switch being in a second position to energize and partially close an electric circuit within which is included the bulb, the strip of material around the case, and the cap.

2. A device of the character described, comprising a case, a battery within the case, an electric light bulb having one of its electrical connections in contact with one pole of the battery, an electric switch, a strip of electrically conductive material wrapped spirally around the outside of the case in position to receive one terminal of a fuse to be tested, an electric contact from the other pole of the battery on the outside of the case to receive the other terminal of the fuse, an electric switch, circuits controlled by the switch to energize the bulb, and switch means to energize and partially close a circuit within which is included the bulb, the spirally wound strip, and the electric contact on the outside of the case.

3. In a device of the character described, the combination with a flash light having a battery case, a battery therein, an electric light bulb, a circuit associated with said bulb and said battery, a switch within said circuit, a cap for the case at the rear end thereof formed of material to conduct electricity and adapted to receive one terminal of a fuse to be tested, and means connecting one pole of the battery to said cap, of means to receive the other terminal of said fuse comprising a thin strip of electrically conductive material wound spirally about the outside of said case and substantially coextensive with the length thereof, and switch means to energize and partially close an electric circuit within which is included the bulb, the strip of material around the case, and the cap.

SAMUEL C. STAMPS.